2,808,440
Patented Oct. 1, 1957

2,808,440

PROCESS OF MANUFACTURING 5-HYDROXY-VALERALDEHYDE

Joseph B. Dickey and Frederick B. Joyner, Kingsport, Tenn., assignors to Eastman Kodak Company, Rochester, N. Y., a corporation of New Jersey No Drawing. Application September 8, 1955, Serial No. 533,260

4 Claims. (Cl. 260—602)

This invention relates to improvements in the manufacture of 5-hydroxyvaleraldehyde and 1,5-pentanediol by hydrolysis of 2,3-dihydropyran, according to the equation:

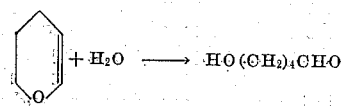

and hydrogenation of the resulting 5-hydroxyvaleraldehyde, according to the equation:

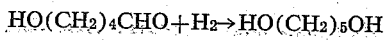

In particular, our invention relates to an improvement in the process of hydrolyzing 2,3-dihydropyran to give 5-hydroxyvaleraldehyde.

Schniepp and Geller, in Am. Chem. Soc. 68, 1646 (1946), describe the preparation of 1,5-pentanediol from 2,3-dihydropyran. Their method involves the hydrolysis of 2,3-dihydropyran in boiling 0.2 N hydrochloric acid to give a 78.2% yield of 5-hydroxyvaleraldehyde, and subsequent reduction of the 5-hydroxyvaleraldehyde, using a copper chromite catalyst. All of the prior are processes for the manufacture of 1,5-pentanediol requiring the hydrolysis of 2,3-dihydropyran involve the use of dilute mineral acids, which must be neutralized before isolation of the intermediate 5-hydroxyvaleraldehyde or before direct reduction of the product to 1,5-pentanediol. On a commercial basis, such procedures would entail expense, and are not readily adaptable to a continuous process.

It is an object of this invention to provide a new and improved process for the production of 5-hydroxyvaleraldehyde and 1,5-pentanediol. Another object is to provide a process for the hydrolysis of 2,3-dihydropyran to 5-hydroxyvaleraldehyde which entails no loss of catalyst through an expensive neutralization procedure. Another object is to provide a method for the production of 5-hydroxyvaleraldehyde which is readily adaptable to a continuous process. A further object is to provide an efficient process for the production of 1,5-pentanediol.

These objects are attained in accordance with this invention by hydrolyzing 2,3-dihydropyran in the presence of an acidic ion-exchange resin and hydrogenating the resulting 5-hydroxyvaleraldehyde in the presence of a hydrogenation catalyst.

In the preferred method of practicing this invention, 2,3-dihydropyran is hydrolyzed by heating with water in the presence of an acidic ion-exchange resin. A substantially neutral aqueous solution of 5-hydroxyvaleraldehyde is formed. This solution is readily separated from the resin, and is then subjected to hydrogenation in the presence of a hydrogenation catalyst.

The hydrolysis reaction can be carried out continuously by passing an emulsion or solution of the 2,3-dihydropyran in a substantially aqueous medium over the acid ion-exchange resin at an elevated temperature. The required contact time will depend upon the reaction temperature. Batchwise, the reaction can be carried out by vigorously stirring a mixture of the 2,3-dihydropyran, water, and resin while the mixture is heated to the desired temperature. The dihydropyran may also be added to a water-resin mixture which has been preheated to the desired reaction temperature.

It is desirable to carry out the hydrolysis reaction at temperatures between 50° C. and 95° C. Higher and lower temperatures are operative, but higher temperatures favor resinification of the product, and lower temperatures require extended reaction periods. The reaction periods necessary vary inversely with the reaction temperature. At the preferred reaction temperatures of 75° to 90° C., 97 to 98% conversion of 2,3-dihydropyran to 5-hydroxyvaleraldehyde is obtained in periods ranging from 5 to 15 minutes. Periods of reaction longer than 15 minutes at these temperatures result in reduced yields of 5-hydroxyvaleraldehyde, due to resinification. One of the advantages of our process over those of the prior art is that our process can be carried out at lower temperatures, thus avoiding resinification and loss of the aldehyde formed. External cooling of the reaction vessel is unnecessary.

It is desirable to carry out the hydrolysis using 5 to 15 mols of water per mol of 2,3-dihydropyran; that is, about 1 to 3 parts by weight of water per part of 2,3-dihydropyran. The use of smaller quantities of water tends to favor resinification; the use of larger quantities entails unnecessary expense, since the water must be removed from the final product (1,5-pentanediol) by distillation.

The amount of resin required for the hydrolysis may vary over a wide range depending on the acid strength and capacity of the resin. The preferred resins are those which contain sulfonic acid groups, such as Amberlite IR–120 (Rohm & Haas Company), Dowex 50 (Dow Chemical Company), Permutit Q (The Permutit Company), Amberlite IR–112 (Rohm & Hass Company) and other resins of the sulfonated styrene, sulfonated phenolic and sulfonated coal types. The preferred amount of resin used is that corresponding to 80–170 milliequivalents of sulfonic groups per mol of 2,3-dihydropyran. The resin is unaltered by the reaction under optimum reaction conditions and therefore may be readily recovered for reuse. The resin may be used continuously without change for prolonged periods of time in a continuous operation.

The 5-hydroxyvaleraldehyde is preferably hydrogenated in the aqueous reaction medium following removal of the solution from the resin catalyst. The hydrolyzate occasionally is slightly acidic after removal of the resin catalyst; this acidity may be eliminated, if desired, by the addition of a very small quantity of dilute sodium hydroxide. The hydrogenation is carried out in the presence of a hydrogenation catalyst, preferably Raney nickel, at a pressure of 1000–2000 p. s. i., preferably 1500 p. s. i., and at a temperature of 75° C. to 190° C. Generally, these conditions are maintained for about 3 hours after absorption of the hydrogen is complete, but this is not essential.

The following examples further illustrate the invention.

*Example 1.*—A mixture of 168 g. of freshly distilled 2,3-dihydropyran, 540 g. of demineralized water, and 80 g. of the acid form of Amerlite IR–120 (Rohm & Hass Co). is stirred vigorously while it is heated from 25° C. to 88° C. over a 15-minute period. (Amberlite IR–120 is a copolymer of styrene and divinylbenzene containing nuclear substituted sulfonic acid groups.) During this time the layer of 2,3-dihydropyran disappears completely. The mixture is then cooled to 30° C. within 8 minutes and the aqueous portion is filtered from the resin. The resin is washed three times with 50-ml. portions of water and the washings are added to the aqueous solution of the product. The aqueous solution of the 5-hydroxyvaleraldehyde formed is then made neutral to litmus by the careful addition of 3 to 5 drops of 5% aqueous sodium hydroxide. The neutral solution is mixed with 10.5 g. Raney nickel in a hydrogenation bomb and is heated to 150° C. with shaking under a hydrogen pressure of about 1500 p. s. i. These conditions are maintained for 3 hours after absorption of the hydrogen has stopped. The bomb is cooled, vented and emptied. The aqueous solution of the product is filtered and the water is removed by distillation at 5 mm. pressure through a distillation column packed with Berl saddles. The residue of crude product is distilled in vacuo to give 178 g. (an 86% yield) of 1,5-pentanediol boiling at 108–113° C. at 2.2–2.5 mm.

Example 2.—The procedure of Example 1 is followed, using the acid form of Dowex 50 in place of Amberlite IR–120. A good yield of 1,5-pentanediol is obtained. Dowex 50 is a sulfonated polystyrene resin which is cross-linked with divinylbenzene. It is a synthetic cation exchange resin which contains nuclear sulfonic acid groups as the only cation active group. Dowex 50 is a strongly acidic resin with stability to strong acid, strong alkali and oxidizing agents even at elevated temperatures, and is operable over a wide pH range.

Example 3.—168 g. of freshly distilled 2,3-dihydropyran is added over a 5-minute period to a vigorously stirred mixture of 80 g. of the acid form of Amberlite IR–120 and 540 g. demineralized water preheated to 80° C. The temperature of the mixture is maintained at 75–80° C. for 5 minutes after the addition of the dihydropyran is complete. The mixture is rapidly cooled to 30° C. and the aqueous solution of the product is filtered from the resin. From this point on, the procedure of Example 1 is followed. 173 g. of 1,5-pentanediol is obtained: a yield of 83%.

Example 4.—The procedure of Example 3 is followed, using the acid form of Permutit Q in place of Amberlite IR–120. A good yield of 1,5-pentanediol is obtained. Permutit Q is a sulfonated styrene-type cation-exchange resin having only (—SO₃H) exchange groups.

It will be understood that the hydrogenation step of the process may be carried out under different conditions than those described in the above examples. For instance, the aqueous solution of 5-hydroxyvaleraldehyde may be brought to a pH of 4.33 by the addition of acetic acid or other organic acid, after addition of the Raney nickel, and the mixture hydrogenated at 75° C. at 1500 p. s. i. This procedure resulted in an 84% yield of 1,5-pentanediol, after the nickel was filtered off and the product distilled. Hydrogenation under the same conditions, except that the temperature was 190° C., gave a yield in excess of 85%.

If desired, the 5-hydroxyvaleraldehyde formed by hydrolysis of the 2,3-dihydropyran may be isolated from the aqueous solution by distillation, and dissolved in methanol for the hydrogenation step. For instance, 102 g. of 5-hydroxyvaleraldehyde was dissolved in 150 ml. of methanol and 6 g. of Raney nickel was added. Tributylamine was added to give a pH of 8.5, and the mixture was hydrogenated at 75° C. under a pressure of 1500 p. s. i. When hydrogenation was complete, the product was distilled to isolate 1,5-pentanediol in 90% yield. Trimethylamine or tribenzylamine may be used in place of tributylamine.

What we claim as our invention and desire to be secured by Letters Patent of the United States is:

1. A process of manufacturing 5-hydroxyvaleraldehyde which comprises hydrolyzing 2,3-dihydropyran in the presence of the acidic form of an ion-exchange resin of the sulfonated type as a hydrolysis catalyst.

2. A process according to claim 1, in which the ion-exchange resin is a copolymer of styrene and divinyl benzene, containing nuclear substituted sulfonic acid groups.

3. A process according to claim 1, in which the ion-exchange resin is a sulfonated styrene-type cation-exchange resin having only (—SO₃H) exchange groups.

4. A process according to claim 1, in which the hydrolysis is carried out at a temperature of from 75° C. to 90° C., for a period of from 5 to 15 minutes.

References Cited in the file of this patent

UNITED STATES PATENTS 2,572,941    MacLean et al. _____ Oct. 30, 1951

OTHER REFERENCES

Schniepp et al.: J. Am Chem. Soc. 68, 1646–8 (1946).
Kunin et al.: "Ion Exchange Resins," John Wiley & Sons, New York, 1950, p. 138.